No. 790,800. PATENTED MAY 23, 1905.
F. E. MERRILL.
METAL SEAL OR LOCK.
APPLICATION FILED MAR. 8, 1904.
FIG. 1.
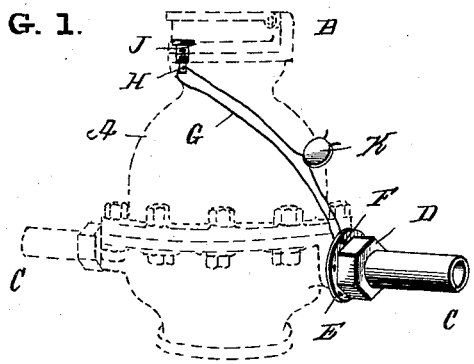
FIG. 2.
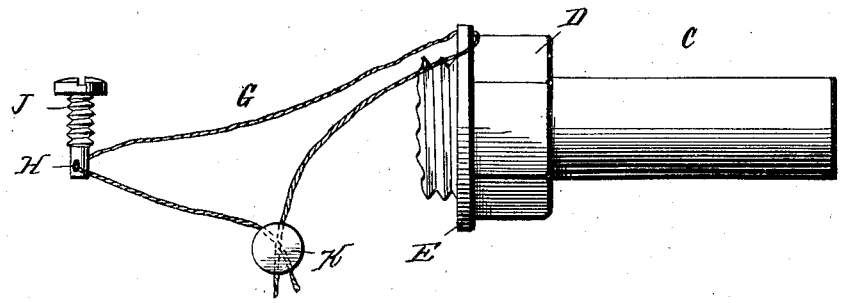
FIG. 3. FIG. 4.
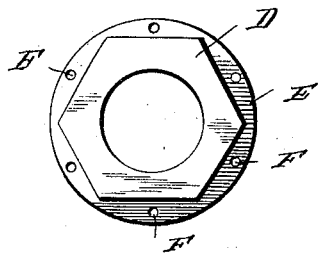 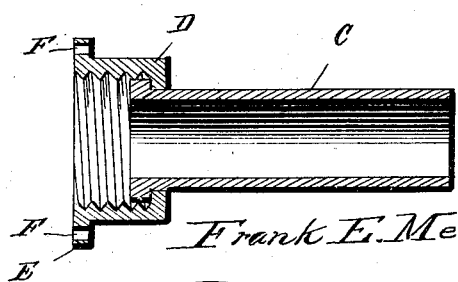
Witnesses
Chas. K. Davis.
M. E. Moore
Frank E. Merrill,
Inventor
by
Attorney No. 790,800. Patented May 23, 1905.

UNITED STATES PATENT OFFICE.

FRANK E. MERRILL, OF SOMERVILLE, MASSACHUSETTS.

METAL SEAL OR LOCK.

SPECIFICATION forming part of Letters Patent No. 790,800, dated May 23, 1905.

Application filed March 8, 1904. Serial No. 197,153.

*To all whom it may concern:*

Be it known that I, FRANK E. MERRILL, a citizen of the United States, residing at Somerville, in the county of Middlesex and State of Massachusetts, have invented certain new and useful Improvements in Metal Seals or Locks, of which the following is a specification.

My invention relates to improvements in metal seals or locks, and while specially adapted for use in connection with water-meter couplings or connections may be employed in any other situation where it would perform its functions in an efficient manner.

The object of my invention is the provision of a seal or lock which can be readily applied at a small expense and which will prove a safeguard against tampering with the meter or other structure to which it is applied and which device will be strong and durable, simple of construction, and thoroughly efficient and practical in every particular.

With the above objects in view my invention consists of a metal seal or lock embodying novel features of construction and combination of parts, substantially as disclosed herein.

Figure 1 represents a perspective view of my seal or lock applied in operative position to a water-meter, the meter being shown in dotted lines. Fig. 2 represents a side elevation of my device; and Figs. 3 and 4 represent detail views of the coupling-nut and the nut and pipe, respectively.

In the drawings the letter A designates a water-meter having the cover or register-case B and the water-connection pipes C, serving as an outlet and inlet, and my device consists of the nut D, formed with an annular flange or rim E, provided in each segment with an opening F, through which passes the sealing-wire or connection G, said wire also passing through an opening H in the screw J, and the ends of the wire or connection are fixed in the metal, generally lead, seal K.

From this construction it will be observed that a perfect seal or connection is formed between the cover and coupling and that the coupling-nut when screwed home always presents one of the openings in the segments of the rim through which the metal connection or wire can be passed. Thus a perfect seal or lock is provided and a lock or seal which is of the simplest and cheapest possible construction and which can be readily and quickly applied to water-meters in general use.

One of the most important features of my invention is the use of the flange-nut having the series of segments each provided with an opening, as this permits the sealing connection to pass through any one of the openings to adapt the device to whatever position the nut may be screwed home.

The purpose of the screw J is to secure the lid or cover of the meter in closed position, and when the screw is driven home its lower end, with opening, passes through, and the seal or locking-wire passes through said opening and makes a seal and lock and prevents tampering with said meter.

I claim—

1. In combination with the meter-casing having the lower inlet and outlet and the top or cover, the pipes entering and leading from the inlet and outlet the flange on one of the pipes, the nut fitting on the flange of said pipe and formed with a collar forming a series of divisions or sections each provided with an opening, the vertical screw passing through the cover and casing and formed with an opening, the wire passing through said openings of the screw and collar of the nut and a seal securing the ends of the wire.

2. In combination with a meter-casing having the lower inlet and outlet and the top or cover, the pipes entering and leading from the inlet and outlet, the nut fitting on one of said pipes and provided with a collar having a series of openings, a screw passing through the cover and casing, a wire passing through one of the openings on the collar of the nut and engaging said screw, and a seal for securing the ends of the wire.

In testimony whereof I have signed my name to this specification in presence of two witnesses.

FRANK E. MERRILL.

Witnesses:
EDWD. M. SHEDD,
L. E. LEAVITT.